US008225385B2

(12) United States Patent
Chow et al.

(10) Patent No.: US 8,225,385 B2
(45) Date of Patent: Jul. 17, 2012

(54) MULTIPLE SECURITY TOKEN TRANSACTIONS

(75) Inventors: Trevin M Chow, Redmond, WA (US); Colin Chow, Bellevue, WA (US); Pui-Yin Winfred Wong, Redmond, WA (US); Dilip K. Pai, Bellevue, WA (US); Sanjeev M Nagvekar, Redmond, WA (US); Wei Jiang, Redmond, WA (US); Yordan I Rouskov, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 993 days.

(21) Appl. No.: 11/277,317

(22) Filed: Mar. 23, 2006

(65) Prior Publication Data

US 2007/0226785 A1 Sep. 27, 2007

(51) Int. Cl.
*H04L 29/06* (2006.01)
(52) U.S. Cl. ............ 726/8; 726/2; 726/5; 713/168; 713/182
(58) Field of Classification Search .................. None
See application file for complete search history.

(56) References Cited

U.S. PATENT DOCUMENTS

| 6,226,752 | B1 * | 5/2001 | Gupta et al. ............... 726/9 |
| 7,530,099 | B2 * | 5/2009 | Flurry et al. ............... 726/8 |
| 2005/0081044 | A1 * | 4/2005 | Giles et al. ............... 713/182 |

FOREIGN PATENT DOCUMENTS

EP 1089516 A2 * 4/2001

OTHER PUBLICATIONS

Hardjono, Thomas, and Jennifer Seberry. "Authentication via multi-service tickets in the Kuperee server." Lecture Notes in Computer Science 875/1994(1994): 143-160. Print.*
Gudgin, Martin. "Using WS-Trust and WS-SecureConversation." Web Services Technical Articles May 2004 Web.<http://msdn.microsoft.com/en-us/library/ms996521(printer).aspx>.*
IBM, Microsoft and Actional, BEA, Computer Associates, Layer 7, Oblix, OpenNetwork, Ping Identity, Reactivity, and Verisign, "Web Services Trust Language (WS-Trust)." (Feb. 2005): <http://download.boulder.ibm.com/ibmdl/pub/software/dw/specs/ws-trust/ws-trust.pdf>.*
Patterson, Pat, Pirasenna Velandai Thiyagarajan, and Marina Sum,. "Federated Identity: Single Sign-On Among Enterprises." Sun Developer Network Oct. 14, 2004 Web.<http://developers.sun.com/identity/reference/techart/federated.html>.*

* cited by examiner

*Primary Examiner* — Kambiz Zand
*Assistant Examiner* — Imhotep Durham
(74) *Attorney, Agent, or Firm* — Lee & Hayes, PLLC

(57) ABSTRACT

Embodiments of multiple security token transactions are described herein. One or more of the described techniques may be utilized to provide, in a single request and response, an authentication token and a plurality security tokens for proof of identity at respective service providers.

12 Claims, 6 Drawing Sheets

MULTIPLE SECURITY TOKEN TRANSACTIONS

BACKGROUND

Users may seek to access to a wide range of resources (e.g., services and content) via a network. For example, users may desire to view web pages, blogs, engage in communications via email or instant messaging, share photos, use applications, and so forth. A variety of service providers provide a large selection of resources to users. Further, some resources of service providers may be protected such that user may need to be authenticated before access is permitted to the resources. Thus, techniques to authenticate users have been developed.

One traditional technique is to have users register and/or subscribe to individual service providers. In these cases, a user may gain access to resources by proving identity, such as by having the user supplying credentials (e.g., typing a username and password) when prompted. A service provider may then understand which user is accessing the resources. However, using these traditional techniques each user may need to remember and enter different credentials to access different resources from one or more service provider. In this traditional technique, authentication to each service provider occurs separately. Accordingly, numerous transactions, which add to network traffic, were required for a user to access resources from a variety of service providers. Further, the user inputted credentials each time resources from a particular service provider were sought. Therefore, these techniques resulted in user frustration and were burdensome not only to the user who may need to keep track and input a variety of credentials corresponding to different service providers, but also to network and computing resources utilized to authenticate credentials.

SUMMARY

Multiple security token transaction techniques are described, in which, a single transaction between a client and authentication service authenticates the client and returns to the client a plurality of security tokens. The client communicates a request to the authentication service that seeks a plurality of tokens and provides credentials (e.g. username and password) for authentication. Upon verification of the credentials, the authentication service issues a response to the client which includes a plurality of security tokens, each being configured to provide proof of the client's identity to access corresponding resources.

The plurality of security tokens may subsequently be provided by the client seeking access to resources from a plurality of service providers, such that, each security token serves as proof of identity to access respective resources from one of the service providers. In an implementation, the plurality of security tokens includes an authentication token configured to provide proof of identity at the authentication service and which may be provided by the client to the authentication service to obtain additional security tokens without requiring the client to resubmit credentials.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same reference numbers are utilized in instances in the discussion to reference like structures and components.

DETAILED DESCRIPTION

Overview

Multiple security token transaction techniques are described. Traditionally, authentication services required separate requests for each resource and/or service provider, thereby resulting in multiple transactions in order to obtain a security token for proof of identity at each service provider and/or for different resources of a service provider. Accordingly, techniques are described which permit request and receipt of multiple security tokens in a single transaction. A transaction refers to a single request and response round trip, such as between a client and server.

A client may execute an application module which forms a request to an authentication service when the client seeks access to resources from a service provider. The request may be configured to seek authentication and a plurality of security tokens. The authentication service authenticates the request using credentials of the user. The authentication service, in response to the request provides the user with a plurality of security tokens each of which may be used to access corresponding resources at one or more service providers. The plurality of security tokens may include service tokens configured to prove identity at a respective service provider and an authentication token configured to prove identity at the authentication service.

A user may then present respective security tokens to access corresponding resources without requiring additional presentation of credentials to the service providers, or to the authentication service. Thus, a single transaction may provide the user with authentication, an authentication token and a plurality of service tokens and accordingly access to a variety of resources from a plurality of service providers.

In the following discussion, an exemplary environment is first described which is operable to employ techniques to provide instant messaging and search. Exemplary procedures and user interfaces are then described which may be provided by the exemplary environment, as well as in other environments.

Exemplary Environment

Figure 1:
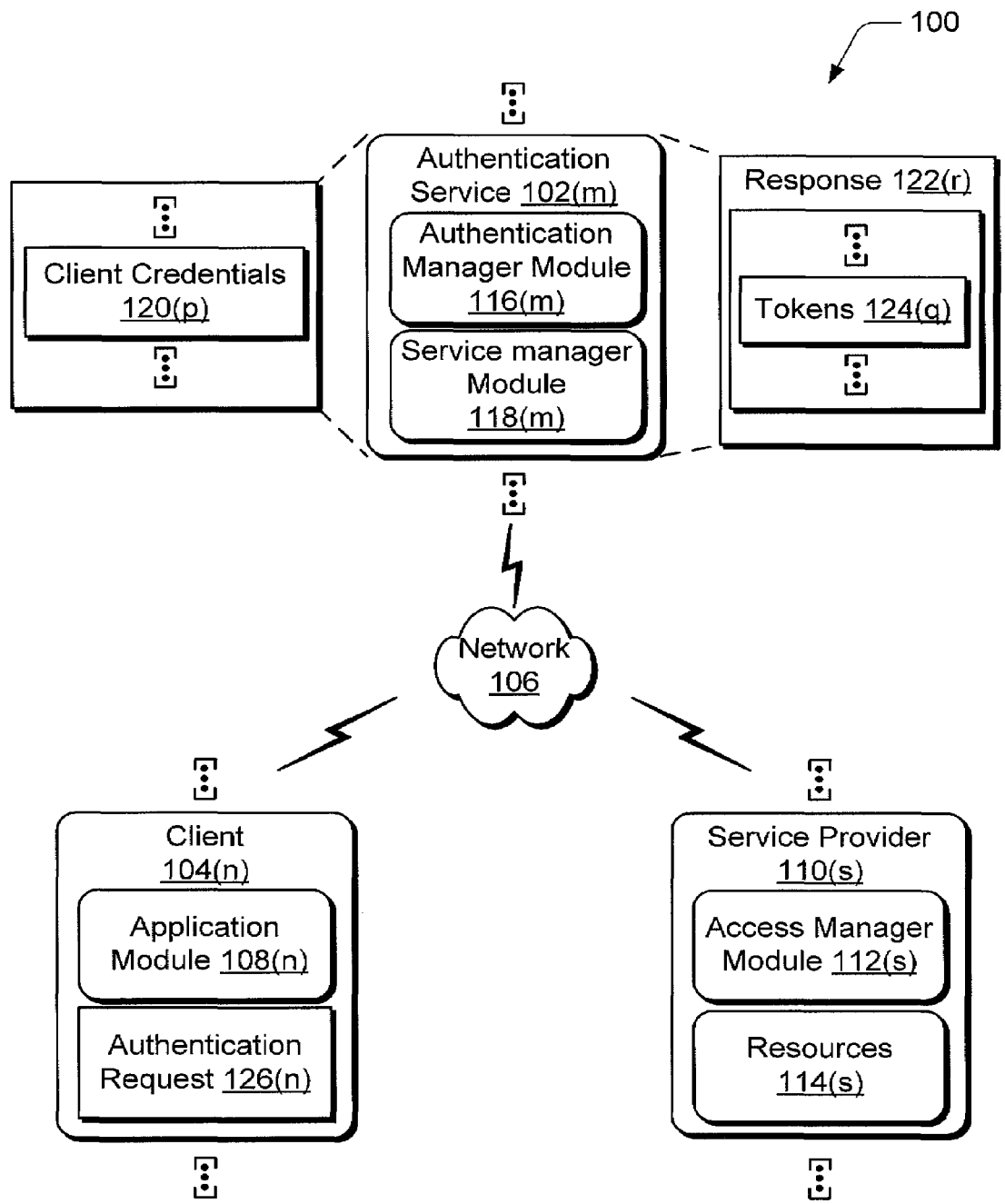
FIG. 1 is an illustration of an environment in an exemplary implementation which is operable to implement an authentication service to provide multiple security tokens in a single transaction between a client and authentication service

FIG. 1 is an illustration of an environment 100 in an exemplary implementation which is operable to implement an integrated authentication service to receive and respond to bundled requests. The environment 100 includes a plurality of authentication services 102(m) (where "m" can be any integer from one to "M") which are accessible by a plurality of clients 104(n) (where "n" can be any integer from one to "N") over a network 106.

The clients 104(n) may be configured in a variety of ways for accessing the network 106. For example, one or more of the clients 104(n) may be configured as a computing device, such as a desktop computer, a mobile station, an entertainment appliance, a set-top box communicatively coupled to a display device, a wireless phone, a game console, and so forth. Thus, the clients 104(n) may range from full resource devices with substantial memory and processor resources (e.g., personal computers, game consoles) to low-resource devices with limited memory and/or processing resources (e.g., traditional set-top boxes, hand-held game consoles). The clients 104(n) may also relate to a person and/or entity that operate the clients. In other words, one or more of the clients 104(n) may describe logical clients that include users, software, and/or devices.

Additionally, although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks. For instance, a client 104(1) may be communicatively coupled via a peer-to-peer network with another client 104(2). Each of the clients 104(1), 104(2) may also be communicatively coupled to the authentication service 102(m) over the Internet. A variety of other instances are also contemplated.

Each of the plurality of clients 104(n) is illustrated as including a respective one of a plurality of application modules 108(n). Application modules 108(n) are executable to provide a variety of functionality to respective clients 104(n). For example, one or more of application modules 108(n) may be configured to send and receive email. Email employs standards and conventions for addressing and routing such that the email may be delivered across the network 106 utilizing a plurality of devices, such as routers, other computing devices (e.g., email servers), and so on. In another example, application modules 108(n) may be configured to provide one or more business productivity functions such as word processing, database, spreadsheet, and presentation functionality. In a further example, application modules 108(n) may be configured to provide one or more software development functions such as development interfaces, tools, management, and compilation. Further, an application module 108 may provide other computing functions such as graphic design, web browsing, and media management, editing, viewing, and/or playback.

In yet another example, one or more of application modules 108(n) may be configured to send and receive instant messages. Instant messaging provides a mechanism such that a plurality of clients 104(n), when participating in an instant messaging session, may send text messages to each other. A plurality of clients 104(n) may be configured to communicate one to another via network 106. The instant messages are typically communicated in real time, although delayed delivery may also be utilized, such as by logging the text messages when one of the clients 104(n) is unavailable, e.g., offline. Thus, instant messaging may be thought of as a combination of e-mail and Internet chat in that instant messaging supports message exchange and is designed for two-way live chats. Therefore, instant messaging may be utilized for synchronous communication. For instance, like a voice telephone call, an instant messaging session may be performed in real-time such that each user may respond to each other user as the instant messages are received Clients 104(n) may further be configured to communicate via network 106 with a plurality of service providers 110(s), where "s" can be any integer from one to "S", via network 106. Service providers 110(s) may be configured in a variety of ways. For instance, service providers 110(s) of FIG. 1 are depicted as each having a respective access manager module 112(s) and are each configured to provide respective resources 114(s) (e.g., services and content) to clients 104(n) via network 106. Access manager module 112(s) is representative of functionality used by the service provider 110(s) to manage access to the resources 114(s) over the network 106, performance of the resources 114(s), and so on. As previously described, some resources 114(s) may be protected such that clients 104(n) executing application modules 108(n) are authenticated before access is permitted to the resources. Access manager module 112(s), for instance, verifies proof of identity before permitting access to resources 114(s). Although illustrated separately, the functionality represented by the access manager module 112(s) may also be incorporated within the resources 114(s) themselves.

It is contemplated that service providers 110(s) may range from those providing a single resource 114 (e.g., an email provider) to those providing numerous resources 114(s). For example, one or more of service providers 110(s) may be configured as a provider of a suite of resources 114(s) rather than individual or relatively limited number of resources 114. In an implementation, a user registers (e.g. "signs-up" of "logs on") a single time with a particular service provider 110 and is provided access to each of the resources 114(s) of the service provider 110 during a session. In this way, the user has access to each of the resources 114(s) whether the user actually uses the resources 114(s) or not, and may do so without registering individually for each different desired resources 114(s). A user may therefore select a single resource 114 and gain access to additional resources 114(s) provided by the particular service provider 110 without manually resubmitting the credentials. In effect, the user turns on the full suite of resources 114(s) upon registration with the particular service provider 110.

Resources 114(s) may be configured in a variety of ways to provide functionality over the network 106 to the clients 104(n). For example, the resources 114(s) may be configured for access via platform-independent protocols and standards to exchange data over the network 106. The resources 114(s), for instance, may be provided via an Internet-hosted module that is accessed via standardized network protocols, such as a simple object access protocol (SOAP) over hypertext transfer protocol (HTTP), extensible markup language (XML), and so on.

A wide range of functionality may be made available to clients 104(n) from one or more service provider 110(s). The resources 114(s), for instance, may be configured as a variety of content, such as web pages, music, video, images, user forums, templates, add-ins, web logs (i.e., blogs), and so forth. Further, service providers 110(s) may provide resources 114(s) which are services, such as instant messaging service, email service, financial service and so forth. For example, plurality of services 114(s) may include a web search service (e.g., a search engine) provided to search the Internet, an email service provided to send and receive email, an instant messaging service to provide instant messaging between the clients 104(n), and so on. Additional examples include a news service, a shopping (e.g., "ecommerce") service and a web log service. Further, productivity services may also be provided, such as word processing, spreadsheets, presentations, drawings, note-taking, and so on. For instance, network access may be given to one or more of client 104(n) to applications that were traditionally executed locally on the clients 104(n). Therefore, execution of the application modules may be performed remotely at the service provider 110(s) and results of the execution may be communicated over the network 106 to the client 104(n). Although a few examples of resources 114(s) have been described, it should be apparent that a wide variety of other resources 114(s) are also contemplated.

In an implementation, the service provider 110(s) is configured to redirect clients 104(n) seeking access to resources 114(s) to authentication service 102(m) for authentication. Thus, rather than authenticate directly with the service provider 110(s), the service provider 110(s) may utilize an authentication service 102(m) for authentication, thereby offloading authentication to the authentication service 102(m). In this way, the service provider 110(s) may be configured to understand whether the clients 104(n) were successfully authenticated by the authentication service 102(m), but does not need to "understand" how the authentication was performed. Authentication via a service may be limited to a particular service provider 110(s), such that authentication would be valid only for the particular service provider 110(s). Alternatively, a single authentication with an authentication service may permit access to resources 114(s) of a plurality of service providers 110(s). In other words, a single verification of credentials (i.e., sign-in) to the authentication service 102(m), may authenticates the client (i.e., provides proof of identity of the client) for access to a plurality of service providers 110(s).

For example, an application module 108(n) configured as a spreadsheet may provide functionality to access resources 114(s) such as protected document templates through the service provider 112(s) via the network 106. Service provider 110(s) and in particular access manager module 112(s) may demand proof of identity when a client 104(n) using application module 108(n) seeks the protected templates. In response, application module 108(n) may provide proof of identity (e.g., a security token) of client 104(n) obtained beforehand from the authentication service 102(m). If client 104(n) does not currently have valid proof of identity, application module 108(n) may be configured to seek authentication of client 104(n) via the authentication service 102(m) to access the necessary token and access resources. A variety of other examples involving application modules 108(n) configured to provide a variety of functionality are also contemplated.

Authentication service 102(m) is depicted as having an authentication manager module 116(m) and a service manager module 118(m). Authentication manager module 116(m) is representative of functionality which may be utilized to authenticate a client 104(n), which may include verification of client credentials. Authentication service 102(m) is also depicted as having client credentials 120(p), which may correspond to respective clients 104(n). Client credentials 120(p) may be used to verify that the clients 104(n) "are who they say they are" or in other words authenticate the client's identity. The client credentials 120(p), for example, may be a user name and password supplied by the client 104(n). Other client credentials 120(p) are also contemplated such as a shared secret, an encryption key and so forth.

Service manager module 118(m) is representative of functionality that may be utilized to determine which service providers 110(s) and/or resources 114(s) of service providers 110(s) a client 104(n) is authorized to access, e.g., upon verification of credentials 120(p). For instance, service manager module 118(m) of an authentication service 102(m) may be configured to generate responses 122(r) having a plurality of security tokens 124(q) for communication to client 104(n). Each of the plurality of security tokens 124(q) may be configured to provide proof of the client's identity for access to a particular service provider 110 and/or resources 114 of the service provider.

In an implementation, authentication service 102(m) may receive an authentication request 126(n) from a client 104(n) seeking authentication and a plurality of security tokens 124(q). The authentication request 126(n) may provide credentials input at the client 104. Upon verification using the client credentials 120(p), authentication service 102(m) may generate a response 122(r) to communicate to a client 104(n) including the requested security tokens 124(q). Thus, in response to a single authentication request the client 104 may receive a plurality of requested security tokens 124(q). In other words, multiple security tokens may be obtained in a single transaction between the client 104 and authentication service 102(m).

Naturally, functionality for authentication, token issuance, response generation, and so forth may be divided differently among various modules of authentication service 102(m) in different implementations without departing from the spirit and scope thereof. Further discussion of the functionality and operation of authentication service 102(m) in relation to clients 104(n) as well as further discussion of single transactions for obtaining multiple tokens 124(q) may be found in relation to FIG. 2.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the multiple security token transaction techniques described below are platform-independent, meaning that the techniques may be implemented on a variety of commercial computing platforms having a variety of processors.

Figure 2:
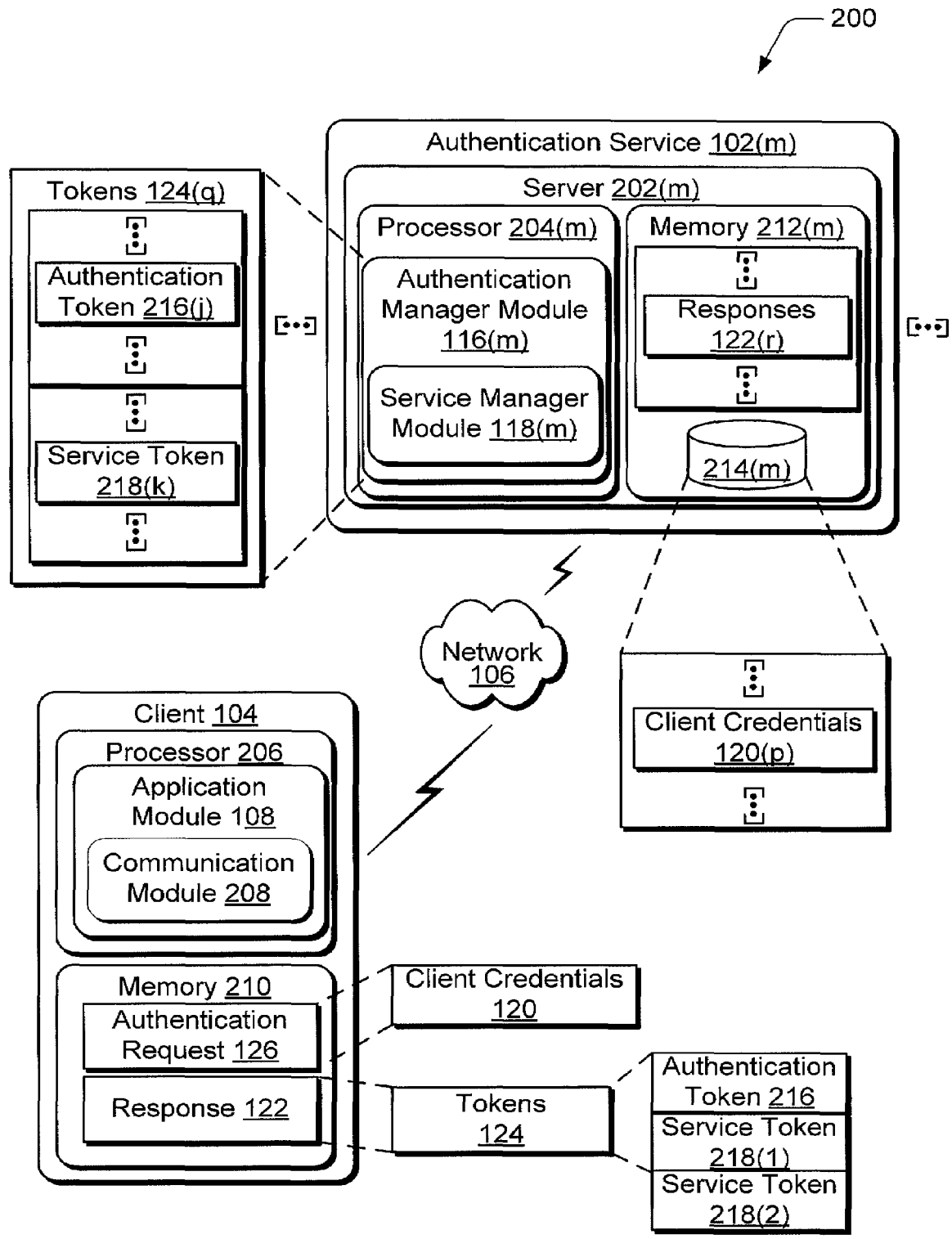
FIG. 2 is an illustration of a system in an exemplary implementation showing an authentication service and a client of FIG. 1 in greater detail.

FIG. 2 is an illustration of a system 200 in an exemplary implementation showing authentication services 102(m) and one of clients of FIG. 1 in greater detail. The plurality of authentication services 102(m) are illustrated as being implemented by a plurality of servers 202(m). Although a single server 202(m) is illustrated for each authentication service 102(m), the authentication service 102(m) may be implemented by one or more servers, e.g., a server farm. The client 104 in FIG. 2 is illustrated as a client device and may be any of the clients 104(n) of FIG. 1. Accordingly, the plurality of servers and the client 104 are each illustrated as including a respective processor 204(m), 206 and respective memory 212(m), 210.

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 210, 212(m) is shown for the client 104 and respective servers 202(m), a wide variety of types and combinations of memory may be employed, such as random access memory (RAM), hard disk memory, removable medium memory, and other types of computer-readable media.

As previously described, the application modules 108(n) of FIG. 1 may be configured to provide access to resources 114(s) of a plurality of service providers 110(s). FIG. 2 depicts client 104 having the respective application module 108 as being executed on the processor 206 and is storable in memory 210. Further, application module 108 is depicted as incorporating a communication module 208 representative of functionality to provide access to a variety of resources 114(s) from a variety of service providers 110(s) of FIG. 1. The communication module 208 is executable to provide interaction between client 104 and authentication service 102(m) as well as with service providers 110(s) of FIG. 1. Thus, communication module 208 may manage transactions between the client 104 and authentication service 102(m) to authenticate the client 104 and obtain a plurality of security tokens 124. Further, the communication module 208 may be configured to provide appropriate security tokens 124 to a service provider 110(s) to gain access to the resources 114(s) of the service providers 110(s).

Communication module 208 is executable to form an authentication request 126 for communication to authentication service 102(m). An authentication request 126 is depicted within memory 210 of client 104. The request 126 may include client credentials 120, such as credentials input by a user of the client 104. The authentication request 126 request may further seek a plurality of security tokens 124, each being useable to access respective resources and/or service providers. Thus, a single request 126 may be communicated for verification of credentials and to obtain a plurality of security tokens 124

In an implementation, the request 126 is based upon Web Service Trust (WS-Trust) protocol. WS-Trust provides protocols for requesting, issuing and brokering security tokens. In particular, operations to acquire, issue, renew and validate tokens are defined by WS-Trust. Traditionally, however, WS-Trust was limited to single requests for tokens, and therefore WS-Trust defined requests for individual tokens but did not define operations to request multiple security tokens in a single transaction. In an implementation, the WS-Trust protocol is extended with syntax to support a multiple security token transaction. In this manner, a request based upon WS-Trust may be employed such that a single request may be utilized to request a plurality of security tokens, thereby conserving network, client and server resources.

The following provides an exemplary sample of a portion of a multiple security token request illustrating extensions to WS-Trust that may be used to obtain multiple security tokens:

```
. . .
<!-- multiple requests -->
    <ps:RequestMultipleSecurityTokens xmlns:ps="http://location.com/" Id="RSTS">
        <!-- Token Request 1 -->
        <wst:RequestSecurityToken xmlns="http://schemas.xmlsoap.org/ws/2002/04/secext">
            <wst:RequestType>http://schemas.xmlsoap.org/ws/2004/04/security/trust/
            Issue</wst:RequestType>
            <wsp:AppliesTo xmlns:wsa="http://schemas.xmlsoap.org/ws/2004/03/addressing">
                <wsa:EndpointReference>
                    <wsa:Address>http://serviceprovider1.com</wsa:Address>
                </wsa:EndpointReference>
            </wsp:AppliesTo>
            <wsse:PolicyReference URI='http://policylocation.com/policy' />
        </wst:RequestSecurityToken>
        <!-- Token request 2: -->
        <wst:RequestSecurityToken xmlns="http://schemas.xmlsoap.org/ws/2002/04/secext">
            <wst:RequestType>http://schemas.xmlsoap.org/ws/2004/04/security/trust/
            Issue</wst:RequestType>
            <wsp:AppliesTo xmlns:wsa="http://schemas.xmlsoap.org/ws/2004/03/addressing">
                <wsa:EndpointReference>
                    <wsa:Address>http://serviceprovider2.com</wsa:Address>
                </wsa:EndpointReference>
            </wsp:AppliesTo>
            <wsse:PolicyReference URI='http://policylocation.com/policy'>
        </wst:RequestSecurityToken>
. . .
```

In the above request, the addition of <ps:RequestMulitpleSecurityTokens> node enables the client 104 and authentication service 102(m) to streamline the security token request process. This allows multiple <wst:RequestSecurityToken> sub-nodes in a single request 126, thereby permitting a client 104 to obtain a plurality of security tokens 124 in a single transaction with authentication service 102(m).

Authentication service 102(m), through execution of the authentication manager module 116(m), may receive an authentication request 126 based upon WS-Trust extended as described above from over the network 106. For example, server 202(m) receives the request seeking authentication and the plurality of security tokens 124. Server 202(m) is depicted as executing authentication manager module 116(m) and service manager module 118(m) on processor 204(m). In the depicted implementation, service manager module 118(m) is depicted incorporated within authentication manager module 116(m). Naturally, the modules may also be stored in memory 210(m).

In an implementation, the authentication manager module 116(m), when executed on processor 204(m) of server 202(m), authenticates an authentication request 126 that is sent by a client 104. For instance, authentication of a request 126 may include accessing and verifying through use of client credentials 120(p). As depicted in FIG. 2, the plurality of client credentials 120(p) corresponding to a plurality of clients 104

(n) are maintained in storage 214(m) of memory 212(m) provided with server 202(m). It is noted that while client credentials are shown on server 202(m), credentials could be maintained on another server 202 of authentication service 102(m) or otherwise located remotely in storage. The credentials 120(p) located remotely may be accessible via network 106.

Credentials 120 indicated in the authentication request 126 may be checked against credentials 120(p) stored by the authentication service 102(m) to authenticate the request. In general, credentials are verified by comparing credential information (e.g., name and password) provided by the client 120 with client credentials 120(p) accessible to authentication service 102(m) (e.g. stored in memory 210(m)). Client credentials 120(p) may be verified using numerous authentication schemes, such as by challenge/response, digest, negotiate, NT LAN Manager (NTLM), kerberos, basic (clear text) and so forth. This may include transferring credentials (e.g., clear text) between client 104 and server 202(m) via network. Alternatively a scheme in which user credentials 120 are not sent over network 106 (e.g., challenge/response) may be used for enhanced security.

Once the authentication request 126 configured to seek multiple security tokens is authenticated, authentication service 102(m) is further configured to generate a response 122 corresponding to the request 126 for communication to client 104. A plurality of responses 122(r) corresponding to a variety of requests 126(n) from clients 104(n) are depicted in memory 212(m) of server 202(m) in FIG. 2. In particular, the responses 122(r) are configured to communicate a plurality of security tokens 124 in a single request and response round trip between a client 104 and an authentication server 102(m). In other words, multiple security tokens are obtained in a single transaction.

A plurality of security tokens 124(q) are depicted as being generated by authentication service 102(m) and more particularly by authentication manager module 116(m) and/or service manager module 118(m) in FIG. 2. Security tokens 124(q) are configured as data or objects which may be used to prove an assertion such as the identity of client 104. Security tokens 124(q) may be configured in a variety of ways, such as a public key, a shared secret, a binary large object, and or other forms of data which may be utilized by a client 104 to prove identity at a service provider 110(s).

Further, a variety of types of security tokens 124(q) may be issued by an authentication service 102(m). FIG. 2 for instance depicts the plurality of security tokens 124(q) including one or more authentication token 216(j) and one or more service tokens 218(k). Generally, an authentication token 216(j) is used in transactions between the client 104 and authentication service 102(m) to prove identity of the client 104. A service token 218(k) corresponds to a service provider 110(s) and/or particular resources of a service provider 110(s) and accordingly is used between the client 104 and service provider 110 to prove identity of the client 104. Thus, in a single transaction a client 104 may request and receive one or more authentication token 216(j) for use with a respective authentication service 102(m) and one or more service tokens 218(k) for use with respective service providers 110(s).

Naturally, the set of tokens 124 requested and received may be configured in a variety of ways. The set of tokens 124 requested and received in a transaction may be specified by default, for instance, in the default configuration of an application module 108 or communication module 208. Further, an option may be provided to a client 104 to specify which tokens to obtain in an authentication transaction, e.g. by input from a user. Thus, when a client 104 seeks resources from one service provider 110, authentication may occur via authentication service 102(m) and the client 104 may receive an authentication token 216 and a service token 218 corresponding to each resources and/or service provider specified in the authentication request 126.

For example, client 104 may desire authentication to the authentication service 102(m) and access to resources 114(s) from a plurality of service providers 110(1) and 110(2). Communication module 208 may be configured to generate a request 126 seeking an authentication token 216(j) and service tokens 218(k) corresponding to each of the desired service providers 110(1), 110(2). Client 104 may accordingly communicate a request 126 having credentials 120 to authentication service 102(m). Authentication module 116(m) may be executed to authenticate the client 104, e.g., by verifying credentials. Upon authentication service manager module 118(m) may be executed to generate a response 122(r) for communication to client 104 having a plurality of tokens 124 including an authentication token 216 and services tokens 218(1), 218(2) corresponding respectively to service providers 110(1), 110(2). Client 104 receives the response 122 which in FIG. 2 is depicted as stored in memory 210 of client 104 and includes a plurality of tokens 124, and which further includes authentication token 216 and a plurality of service tokens 218(1), 218(2). The received plurality of tokens 124 may be used by the client 104 to prove identity of the client 104 at the corresponding authentication service 102(m) and service providers 110(s) respectively, without requiring submission of credentials.

It is noted that responses 122(r) to multiple security token requests 126 may also be based on WS-Trust. As previously noted, traditionally WS-Trust was limited to single requests for tokens, and therefore WS-Trust defined requests for individual tokens but did not define operations to request multiple tokens in a single transaction. Further, WS-Trust did not define operations for handling errors associated with a request for multiple tokens. For instance, each service provider 110(s) for which an authentication service 102(m) manages authentication may have different authentication policies. Thus, a successful login of a client 104 for one service provider 110 does not mean that the client 104 has met the criteria for each service provider 110(s) in the multiple security token request. In other words, authentication sufficient for each security token requested may be according to different levels of proof, e.g., according to different terms and/or requiring different credentials. Some security tokens requested in a multiple security token request may be granted while other are not granted. Thus, a single authentication error node in a response to a multiple security token request is not sufficient to handle differential treatment of various security tokens sought in the request.

Accordingly, in an implementation WS-Trust is extended with syntax for separately handling authentication errors for each security token requested in a multiple security token request described herein. In particular an error node is embedded inside each <wst:RequestSecurityTokenResponse> node of a response 122 to in a multiple security token request 126. The following provides an exemplary sample of a portion of a response 122 to a multiple security token request 126 returning multiple tokens in accordance with WS-Trust and having an error node embedded inside each <wst:RequestSecurityTokenResponse> node:

```
...
  <!--Token 1 Response -->
  <wst:RequestSecurityTokenResponse>
    <wst:TokenType>urn:oasis:names:tc:SAML:1.0</wst:TokenType>
    <wsp:AppliesTo xmlns:wsa="http://schemas.xmlsoap.org/ws/
      2004/03/addressing">
      <wsa:EndpointReference>
        <wsa:Address>errorSample.location.com</wsa:Address>
      </wsa:EndpointReference>
    </wsp:AppliesTo>
    <Fault xmlns="http://schemas.xmlsoap.org/soap/envelope/">
      <faultcode>S:Client</faultcode>
      <faultstring> Request failed</faultstring>
        <psf:pp xmlns:psf='http://sampleaddress/SOAPFault'>
          <psf:authstate>0x80048812</psf:authstate>
          <psf:reqstatus>0x80048828</psf:reqstatus>
          <psf:flowurl>https://sampleaddress.com</psf:flowurl>
        </psf:pp>
    </Fault>
  </wst:RequestSecurityTokenResponse>
  <!--Token 2 Response -->
  <wst:RequestSecurityTokenResponse>
  <wst:TokenType>wsse:X509v3</wst:TokenType>
  <wsp:AppliesTo xmlns:wsa="http://schemas.xmlsoap.org/ws/
    2004/03/addressing">
    <wsa:EndpointReference>
      <wsa:ServiceName>urn:passport:SomeOnesSLC</
      wsa:ServiceName>
    </wsa:EndpointReference>
  </wsp:AppliesTo>
  <Fault xmlns="http://schemas.xmlsoap.org/soap/envelope/">
    <faultcode>S:Client</faultcode>
    <faultstring> Request failed</faultstring>
    <psf:pp xmlns:psf='http://sampleaddress.com/SOAPFault'>
      <psf:authstate>0x80048812</psf:authstate>
      <psf:reqstatus>0x80048828</psf:reqstatus>
      <psf:flowurl>https://sampleaddress.com</psf:flowurl>
    </psf:pp>
  </Fault>
  </wst:RequestSecurityTokenResponse>
...
```

In the above response, a <Fault> node is embedded in each of the <wst:RequestSecurityTokenResponse> nodes. This allows for a response 122 with individualized treatment of errors associated with each security token 124 sought in a multiple security token request 126, for instance by using a plurality of error nodes in the single response 122. Thus, in accordance with the previous description, a request 126 based upon WS-Trust may be employed such that a single transaction may be utilized to obtain a plurality of security tokens 124, thereby conserving network, client and server resources. Further error associated with a multiple security token requests 126(n) may be handled on an individualized basis.

Exemplary Procedures

The following discussion describes procedures that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and/or the system 200 of FIG. 2.

Figure 3:
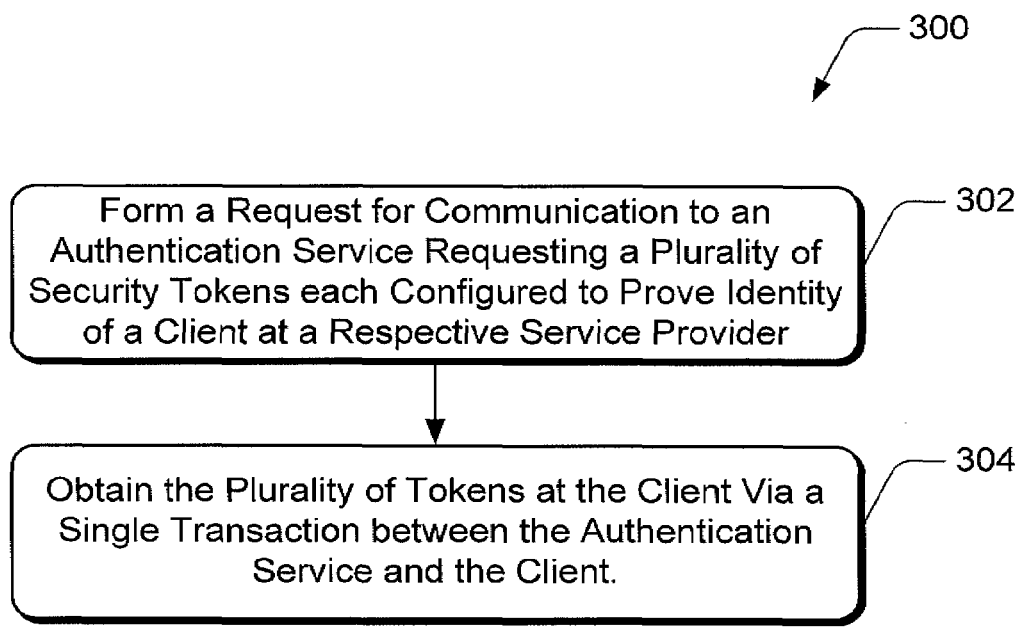
FIG. 3 is a flow diagram depicting a procedure in an exemplary implementation in which a client generates an authentication request seeking multiple security tokens.

FIG. 3 is a flow diagram depicting a procedure 300 in an exemplary implementation in which a client obtains a plurality of security tokens in single transaction. A request is formed for communication to an authentication service requesting a plurality of security tokens each configured to prove identity of a client at a respective service provider (block 302).

For example, one of clients 104(n) of FIG. 1 may be executing an application module 108 configured to provided instant messaging functionality as previously discussed. Application module 108, for instance, when executed may provide an instant messaging session between clients 104(n), either in indirect communication through a service provider 110(s) over network 106 or in direct communication such as via a peer-to-peer network. A first service provider 110(1) providing the instant messaging service may require a corresponding token 124(1) to permit access to the instant messaging service. Thus, client 104, when desiring to engage in instant messaging, may seek a service token corresponding to service provider 110(1).

In addition, client 104 may desire additional resources 114 from the same service provider 110(1) or other service providers 110(s), such as web pages, document templates, authentication, multimedia content and so forth. For instance, client 104 desiring additional resources 114(s) may also seek additional tokens 124(q) corresponding to the additional resources 114(s) and/or service providers 110(s). Thus, client 104 may be seeking resources 114(s) from one or more service providers 110(s). Accordingly, the client 104, and more specifically application module 108, forms a request 126 for communication to authentication service 102(m). The request 126 seeks a plurality of tokens 124 corresponding to instant messaging service and additional resources 114(S). Thus, each of the requested tokens 124 may be configured to prove the identity of the client 104 at the respective service provider 110 providing the corresponding resources 114(s).

The plurality of tokens is obtained at the client via a single transaction between the authentication service and the client (block 304). In the previous example, the request 126 may be communicated to authentication service 102(m). The authentication service 102(m) authenticates the request, for instance via credentials 120(p) maintained by the service, and compared to credentials indicated in the request 126. Upon authentication of the request 126, a response 122 is generated which includes the requested tokens 124. Thus, in a single transaction (e.g., one request and response round trip) between client 104 and authentication service 102(m), the client obtains a plurality of tokens, each of which is configured to provide access to respective resources 114(s) of one or more service provider.

Figure 4:
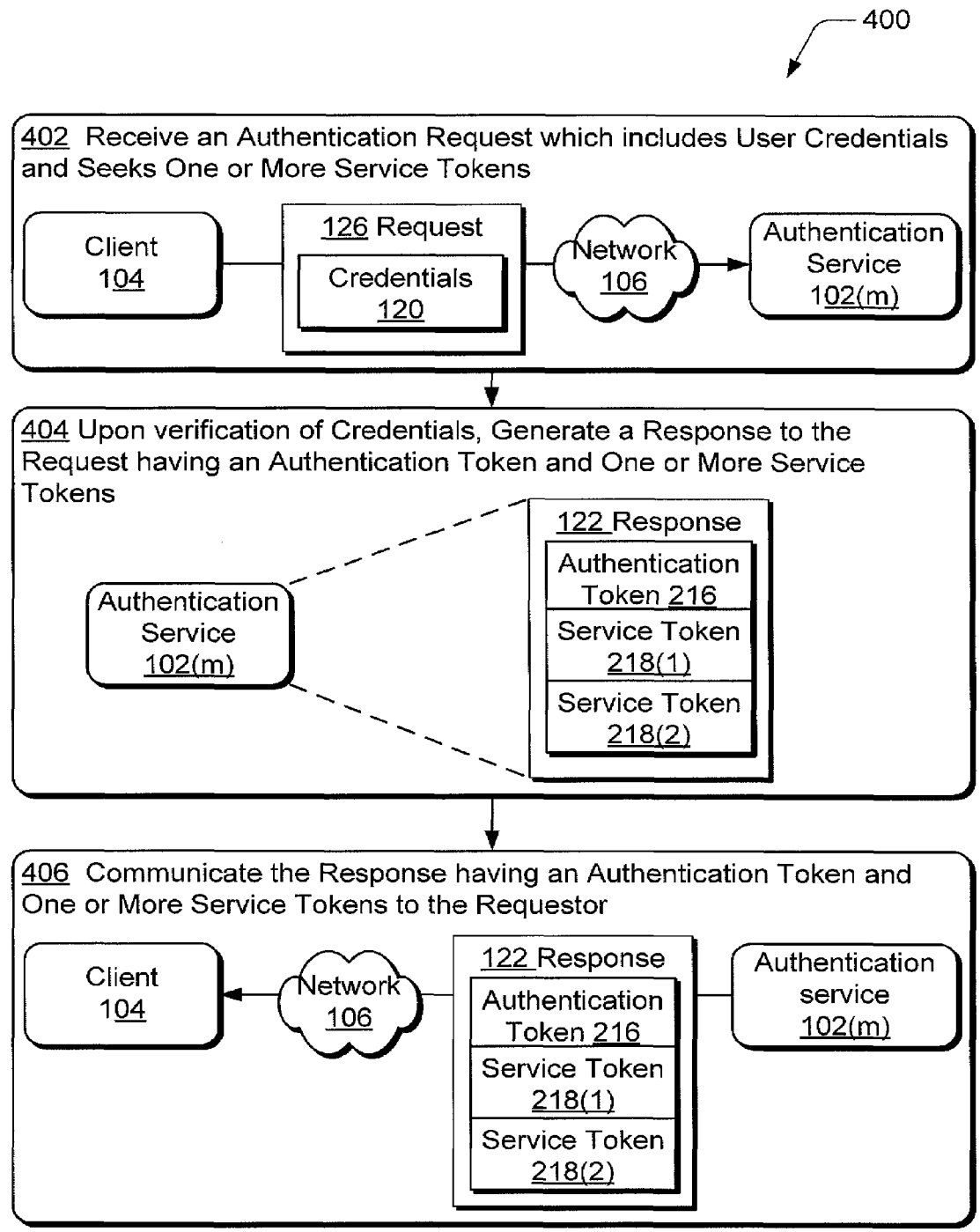
FIG. 4 is a flow diagram depicting a procedure in an exemplary implementation in which an authentication service communicates a response to an authentication request from a client seeking one or more service tokens.

FIG. 4 is a flow diagram depicting a procedure 400 in an exemplary implementation in which an authentication service receives, processes and responds to a request for a plurality of service tokens. An authentication request is received which includes user credentials and seeks one or more service tokens (block 402). For example, authentication service 102 (m) depicted in FIG. 2 may receive an authentication request 126 from client 104(n) over network 106. The request may be based upon an extended WS-Trust protocol to allow multiple security token requests as previously described. In addition, the request includes credentials 120 provided by the client 104 which may be used to authenticate the client 104, e.g., prove the client 104 "is who they say they are". Client 104 accordingly may be seeking an authentication token 216 to be used to prove identity to the authentication service 102(m). Client 104 via the same request 126 may also be seeking a plurality of service tokens 218(k) corresponding to different service provider 110(s) and/or resources 114 of the service providers 110(s). For example, client may be seeking access to web pages from a first service provider 110(1) and to document templates from a second service provider 110(2).

Service providers 110(1), 110(2) each require a corresponding service token 218(1), 218(2) before access is given to the respective resources 114.

Upon verification of credentials, a response is generated having an authentication token and one or more service tokens (block 404). For example, authentication service 102(m) may access credentials 120(p) stored in memory 212(m) of server 202(m). Credentials 120(p) may be verified, for instance, against a username and password provided in the received request 126. In another instance, authentication service 102(m) initiates a challenge/response authentication scheme which does not require client 104(n) to send credentials (e.g., user name and password) over the network 106 and may accordingly increase security. Upon authentication, authentication service 102(m) through service manager module 118(m) generates a response 122 having an authentication token 216 and a plurality of service tokens 218(1), 218(2) corresponding to the authentication request 126. The response 122 may be configured in a variety of ways, such as based upon WS-Trust to allow responses to multiple security token requests as previously described.

The response having the authentication tokens and one or more service token is communicated to the requester (block 406). For instance, the response 122 generated in the previous example may be communicated via network 106 to the client 104 requesting the authentication and multiple security tokens 218(k). Client 104 receives the response. Client 104 may thereafter access resources 114(s) using the received plurality of tokens 124(q) and without requiring the client to submit credentials, further discussion of which may be found in relation to FIGS. 5-6.

It is noted that in an implementation, the authentication service 102(m) may provide, in addition to authentication services, any of the variety of resources 114(s) previously described. Thus, an authentication service 102(m) may incorporate the functionality described with respect to service providers 110(s) and vice versa. For example, and authentication service 102(m) may be configured to provide instant messaging service and authentication including the processing of multiple security token requests. A variety of other arrangements of an authentication service 102(m) in combination with other resources 114(s) are also contemplated.

Figure 5:
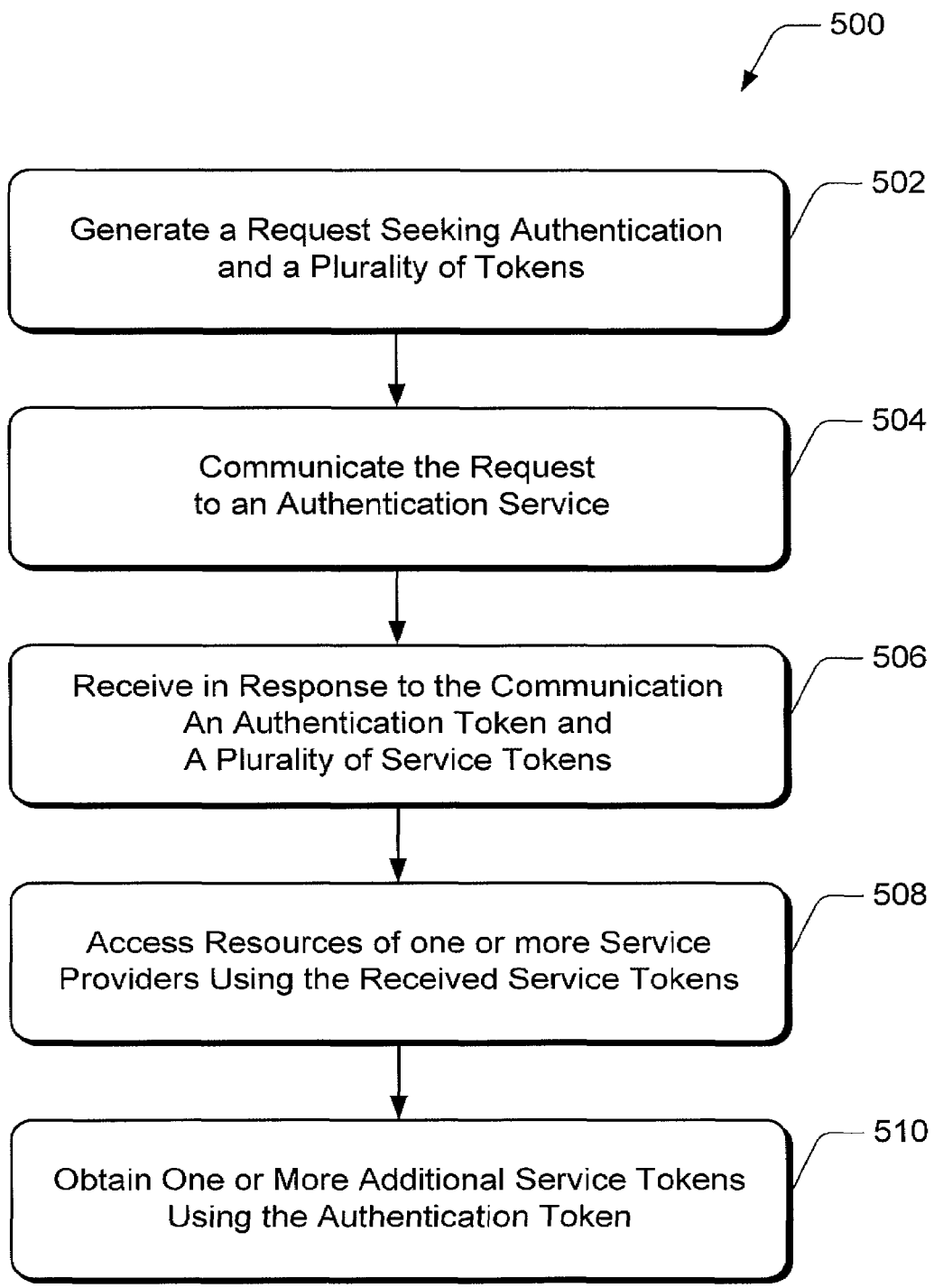
FIG. 5 is a flow diagram depicting a procedure in an exemplary implementation in which a client utilizes a plurality of service tokens and a authentication token received in a single transaction with a authentication service

FIG. 5 is a flow diagram depicting a procedure 500 in an exemplary implementation in which security tokens received in a multiple security token request are utilized to access corresponding resources. A request is generated seeking a plurality of tokens (block 502). For instance, client 104 of FIG. 2 may seek an authentication token 216 and a plurality of service tokens 218(k) and accordingly may execute communication module 208 to generate an authentication request 126. Client 104 perhaps desires a plurality of resources 114(s), such as email, instant messaging, and multimedia content from a single service provider 110. Each of the desired resources 114(s) of the single service provider 110 may require separate service tokens 218(k) before access is permitted. Thus, authentication request 126 is generated to seek the desired tokens. Naturally, a variety of requests 126 seeking a variety of combinations of resources 114(s) from one or more service providers 110(s) may be generated in different instances.

The request is communicated to an authentication service (block 504). The request 126 of the previous example is communicated to authentication service 102(m) via network 106. Authentication service 102(m) may operate as previously described to authenticate the request 126 and issue a response 122.

In response to the communication, an authentication token and a plurality of service tokens are received (block 506). The response 122 issued by authentication service 102(m) in the preceding example is received by the client 104, in response to the communicated request 126 generated in block 502. If the request 126 was successfully authenticated the response will include the requested tokens, e.g. the authentication token 216 and the plurality of service tokens 218(k) corresponding to different resources of a service provider 110. For instance, client 104 receives an authentication token and service tokens 218(k) corresponding to each desired resource 114, e.g., service tokens 218(k) corresponding to each of email, instant messaging, and multimedia content from a single service provider 110. If the request 126 or a portion of the request 126 is not successful, one or more error messages may be returned, for instance an error message embedded within a plurality of token response nodes as described in relation to FIG. 2.

The resources of one or more service provider are accessed using the received service tokens (block 508). Continuing the previous example, service tokens 218(k) corresponding to email service, instant messaging service, and multimedia content service of the service provider 110 may be used to access the respective services. Service provider 110 may execute access manager module 112 to verify that the client 104 has the appropriate tokens 218(k) to access various resources 114(s) provided by the service provider 110. Naturally, a client may receive tokens 218(k) via a single request 126 that correspond to resources 114(s) of a plurality of service providers 110(s), and utilize the respective tokens to access the resources of the one or more service providers 110(s).

The authentication token is utilized to obtain one or more additional service token (block 510). Assume now that client 104 has received the response 122 of the preceding examples including authentication token 216. Client 104 now desires to access resources 114 (e.g. web pages) from another service provider 110. Client 104 did not receive a service token 218 corresponding to the desired web pages in the response 122. Client may use the authentication token 216 in requesting one or more additional service tokens 218(k) from authentication service 102(m). The authentication token 216 is used between the client 104 and authentication service 102(m) to prove identity of the client 104 to the authentication service 102(m), such that the client 104 may obtain additional resources 114(s) from the authentication service 102(m). For instance, the client 104 may obtain an additional service tokens 218(k) corresponding to desired web pages from another service provider 110 and without requiring the client to submit credentials to the authentication service 102(m).

Figure 6:
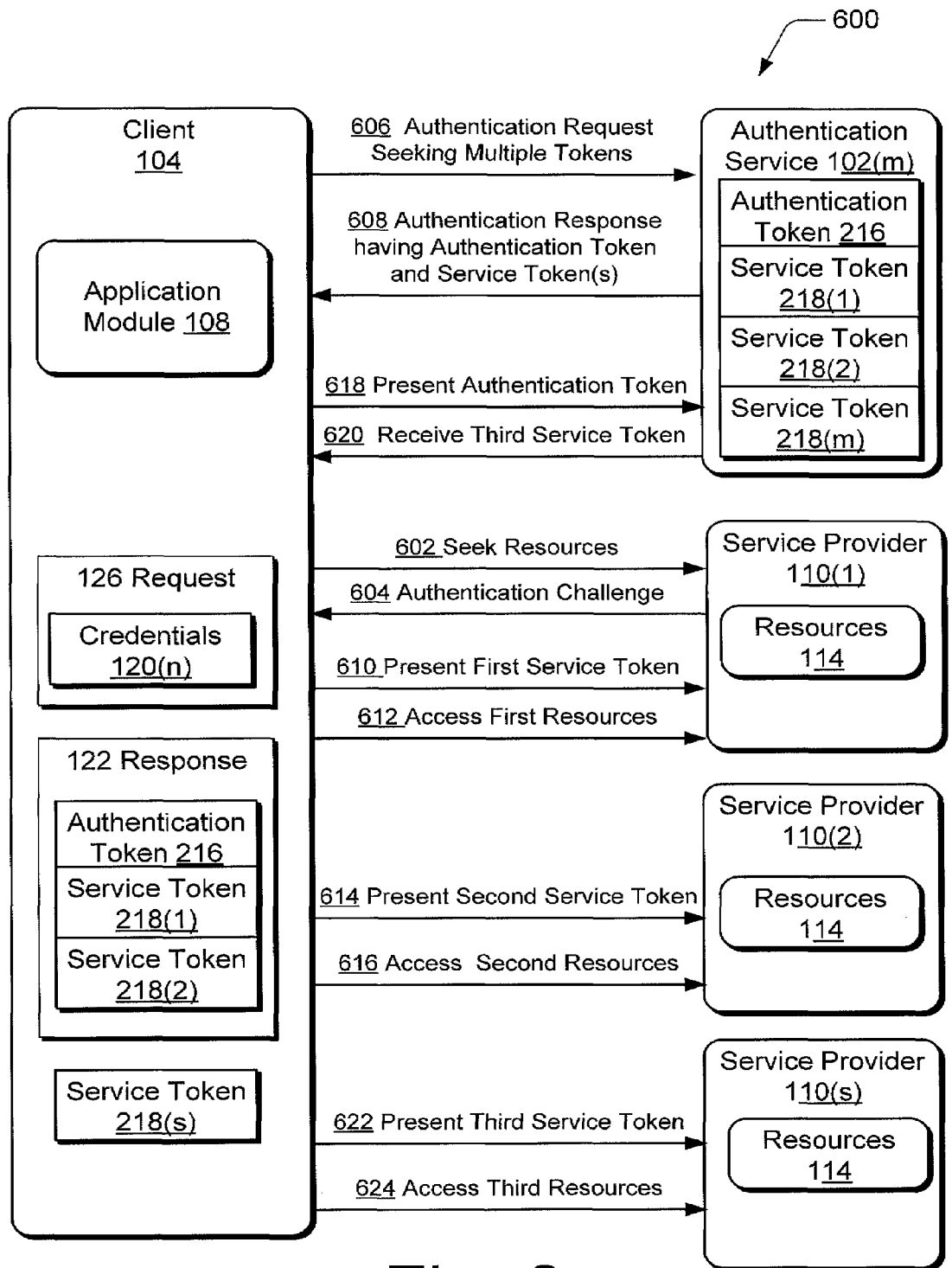
FIG. 6 is an illustration in an exemplary implementation showing interaction between a client, authentication service and a plurality of service providers including multiple security token transaction techniques.

FIG. 6 is an illustration of an exemplary procedure 600 depicting data flow according to a multiple security token request utilized to access resources from a plurality of service providers. In FIG. 6, procedure 600 is shown as a set of arrows used to represent operations that may occur between a representative client 104, authentication service 102(m), and plurality of service providers 110(1), 110(2), 110 (s) and is not necessarily limited to the operations specified by the arrows or to the order shown.

A user may use application module 108 executing on a client 104 to access resources via the Internet. FIG. 6 depicts a plurality of service providers 110(1), 110(2), 110(s) which may provide respective resources 114(s) to a client. The user may seek access to resources from one of the service providers (arrow 602). For instance, application module 108 may be configured as a word processing application which is further configured to provide access to sample document templates via a first service provider 110(1) and access to application updates via a second service provider 110(2). User in this example may desire to obtain document templates from the first service provider 110(1), and may select an option which causes application module 108 to seek the desired resources 114.

Client 104 receives a challenge (arrow 604) from the service provider 110 to authenticate (e.g., prove identity) before access to resources 114 is granted. If Client 104 has sufficient proof of identity, access may be granted. Assuming that the client 104 does not currently have valid authentication tokens 216 and service tokens 218, the client will seek authentication to access the desired resources 114, in particular the document templates. Application module 108 is configured to form an authentication request 126 seeking a service token 218(1) corresponding to service provider 110(1). User may be prompted to provide credentials 120 which are to be included in the request 126. Credentials 120 may also be obtained from a credential store, such as credentials 120 stored in memory 210 of client 104 depicted in FIG. 2. A representative request 126 having credentials 120 is depicted on client 104 in FIG. 6.

Further, a default setting or user selection may cause application module 108 to seek additional service tokens 218(k) in the same request 126. Application module may be configured to maintain or access a listing of service providers and/or resources for which tokens should be sought in an authentication request 126. This may be a list generated based upon commonly used service providers and/or resources, a user specified list, a default setting, a list accessible via network 106 maintained by a community of users, and so forth. In the illustrated example, the authentication request 126 is configured to automatically seek a token 218(2) corresponding to application updates provided by service provider 110(2). This may occur before client 104 has sought access to resources 114 from service provider 110(2). Naturally, application module 108 may be configured to generate a request automatically seeking a plurality of service tokens 218(k) which may include those corresponding to service providers 110(s) and/or resources 114(s) specified in a listing in combination with those corresponding to service providers 110(s) and/or resources 114(s) the client 104 is currently seeking to access.

In an implementation, a user may authenticate directly with an authentication service 102(m) before attempting to access to any resources 114(s) of service provider 110(s). In this case, the application module 108 may form an authentication request 126 using a listing of service providers 110(s) and/or resources 114(s) to determine which security tokens should be sought in the request 126.

The authentication request seeking multiple security tokens is communicated to authentication service (arrow 606) to obtain security tokens appropriate to access the desired resources. Authentication service 102(m) processes the authentication request 126 and upon successful authentication generates a response 122. The response contains an authentication token 216 and a first service token 218(1) and second service token 218(2). The authentication response 122 having authentication token and the service tokens is received by the client 104 (arrow 608). A representative response 122 is depicted as having been received by client 104 in FIG. 6.

The client 104 may now use the received tokens 216, 218(1), 218(2) to access respective resources 114 of corresponding service providers 110(s) and/or authentication service 102(m). First service token 218(1) may be presented to corresponding service provider 110(1) (arrow 610). The presenting may involve actual communicating the service token 218(1) to service provider 110(1) or communications with service provider 110(1) such that service provider 110(1) understands that client 104 has the appropriate service token 218(1) and that the token is valid. Upon verification by the service provider 110(1) that client has the appropriate service token 218(1), client may access desired resources 114 (arrow 612), e.g., the document templates originally sought.

Second service token 218(1) may be presented to corresponding service provider 110(2) (arrow 614). Again, upon verification by the service provider 110(2) that client has the appropriate service token 218(2), client 104 may access resources 114 (arrow 616), e.g., application updates without a user submitting credentials.

Now assume user of client 104 desires additional resources 114 from a third service provider 110(s). For example, service provider 110(s) may provide a service that allows user of client 104 to share the desktop of the client 104 via the internet. The user for instance may wish to share and discuss a document created using application module 108 configured for word processing with a colleague. Before access is granted to resources 114 of service provider 110(s), client may be required to have a corresponding service token 218(s). However, client 104 may not have received the service token 218(s) in response to the initial authentication request 126.

Client 104 may communicate with authentication service 102(m) using the authentication token 216 to obtain the desired token 218(s) without requiring the client 104 to submit credentials. Authentication token is presented to the authentication service (arrow 618). The presenting may involve actual communication of the authentication token 216 to authentication service 102(m) or communications with authentication service 102(m) such that authentication service 102(m) understands that client 104 has the appropriate authentication token 216 and that the token is valid. For example, a second request using the authentication token 216 as proof of identity may be communicated to the authentication service 102(m), seeking the desired service token 218(s). It is noted that the second request may itself be a request seeking a plurality of service tokens 218(k). However in this case, credentials are not required, rather the authentication token 216 (if valid) may be used to access resources 114 of the authentication service 102(m), e.g. to obtain requested service tokens 218(k). Client 104 receives the request service tokens 218(k), including service token 218(s) (arrow 620) corresponding to the desired desktop sharing services of service provider 110(s).

Third service token 218(s) may be presented to corresponding service provider 110(s) (arrow 622). Again, upon verification by the service provider 110(s) that client has the appropriate service token 218(s), client 104 may access desired resources 114 (arrow 624), e.g., desktop sharing services.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. One or more computer-readable storage media, wherein the computer-readable storage media exclude propagating carrier waves, the computer-readable storage media storing computer-executable instructions that, when executed, cause one or more processors to perform operations for transferring a plurality of security tokens comprising:

receiving a request from at least one client for communication by an authentication service requesting the plurality of security tokens, each security token configured to prove an identity of the at least one client at a respective service provider, the request configured according to a web service trust protocol that is extended with syntax to support a multiple security token transaction and to enable inclusion of multiple error nodes in a response to the request by separately handling authentication errors for each security token of the plurality of security tokens, each of the multiple error nodes indicating an authorization state and a request state associated with a respective security token of the plurality of security tokens;

generating the plurality of security tokens by the authentication service;

sending the plurality of security tokens to the at least one client via a single transaction between the authentication service and the at least one client, the plurality of security tokens comprising an authentication token configured to prove the identity of the at least one client at the authentication service;

receiving the authentication token by the authentication service to prove the identity of the at least one client to provide one or more other security tokens;

confirming the identity of the at least one client based on the authentication token;

determining one or more service providers that the at least one client is authorized to access, the one or more service providers configured to provide a suite of resources based on the identity of the at least one client; and generating the one or more other security tokens, each of the one or more other security tokens configured to prove identity of the at least one client at the one or more service providers.

2. The one or more computer-readable storage media as recited in claim 1, wherein the request includes credentials for verification by the authentication service and a single verification of the credentials permits issuance of the plurality of security tokens and the one or more security tokens.

3. The one or more computer-readable storage media as recited in claim 1, wherein at least one of the plurality of security tokens and the one or more security tokens obtained by the at least one client is presentable to a corresponding service provider to prove identity of the at least one client without submitting user credentials.

4. The one or more computer-readable storage media as recited in claim 1, the operations further comprising:

forming the response to the request including the multiple error nodes; and sending the response to the at least one client.

5. The one or more computer-readable storage media as recited in claim 1, wherein the web service trust protocol is extended with syntax that permits the request for the plurality of security tokens and the one or more security tokens.

6. A method of transferring a plurality of security tokens comprising:

receiving, at an authentication server comprising a processor and a computer-readable storage media to store instructions that are executable by the processor, a single request from a client over a network seeking the plurality of security tokens, the plurality of security tokens comprising one or more service tokens;

determining one or more resources of the at least one service provider that the client is authorized to access, each of the one or more service tokens configured to be provided to at least one service provider as proof of the client's identity to access the one or more resources of the at least one service provider;

communicating to the client, in response to the single request, the plurality of security tokens, the plurality of security tokens comprising at least one authentication token configured to be provided to the authentication server as proof of the client's identity to receive another service token;

receiving at the authentication server the at least one authentication token with a second request for the another service token, the another service token configured to be provided to another service provider as proof of the client's identity to access resources of the another service provider;

confirming proof of the client's identity with the at least one authentication token;

providing to the client the another service token; and forming a response to the single request, the response compliant with a web service trust protocol that is extended with syntax to enable inclusion of multiple error nodes in the response, each of the multiple error nodes providing an authorization state and a request state associated with a corresponding security token of the one or more service tokens.

7. The method of claim 6, wherein the communicating occurs upon verification of client credentials indicated in the single request.

8. The method of claim 6, wherein the resources of the service providers and the another service provider are selected from the group consisting of:

instant messaging service;
web search service;
e-mail service;
productivity applications;
multimedia content;
and
blogs.

9. The method of claim 6, wherein the web service trust protocol is further extended to support a multiple security token transaction and wherein the single request is configured according to the extended web service trust protocol.

10. The method of claim 6, wherein extending the web service trust protocol with syntax to permit the inclusion of the multiple error nodes in the response to the single request comprises separately handling authentication errors for each security token of the plurality of security tokens.

11. One or more computer-readable storage media, wherein the computer-readable storage media exclude propagating carrier waves, the computer-readable storage media storing computer-executable instructions that, when executed, cause one or more processors to perform operations for transferring a plurality of security tokens comprising:

communicating to an authentication service a request having credentials to authenticate a client and requesting the plurality of security tokens, the authentication service to determine a plurality of resources that the client is authorized to access, the request configured according to a web service trust protocol that is extended to support a multiple security token transaction and to separately handle authentication errors for each security token requested in the multiple security token transaction by embedding an error node in a response to the request, each error node indicating an authorization state and a request state associated with each security token of the plurality of security tokens;

sending, in the response to the request, the plurality of security tokens comprising an authentication token and one or more service tokens, each of the one or more service tokens corresponding to a respective service provider;

accepting the authentication token as proof of identity by the authentication server without submitting user credentials to obtain at least one other service token corresponding to another service provider;

confirming the proof of identity based on the authentication token;

sending the at least one other service token to the client; and providing without submitting user credentials the one or more service tokens or the at least one service token to the respective service provider or the another service provider as proof of identity to access one or more resources from the plurality of resources, the one or more resources associated with the respective service provider or the another service provider.

12. The one or more computer-readable storage media as recited in claim 11, wherein the request includes a plurality of request nodes corresponding to each requested security token.

* * * * *